Patented Dec. 26, 1922.

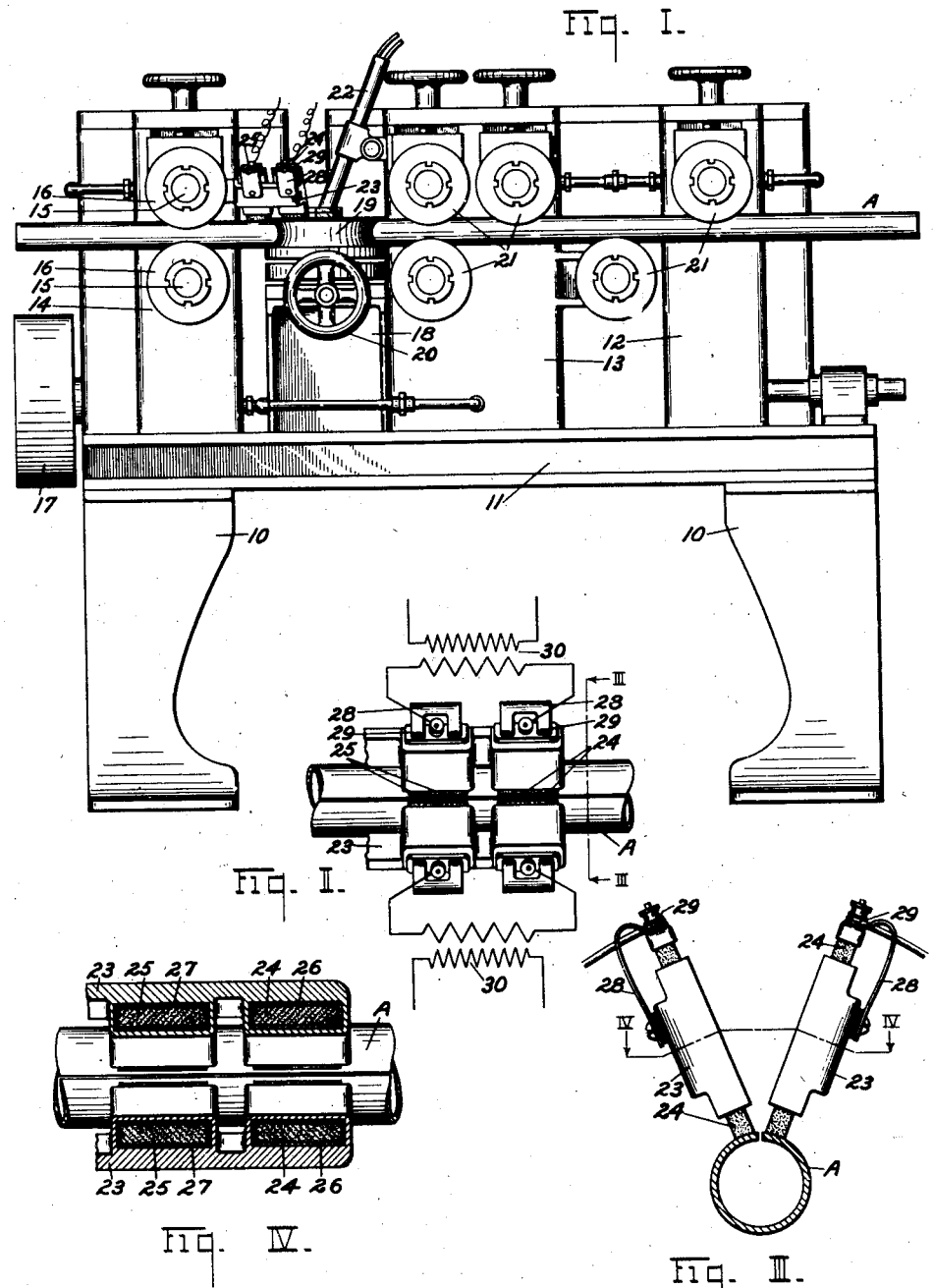

1,439,962

UNITED STATES PATENT OFFICE.

EDWARD KAMPER, OF TOLEDO, OHIO, ASSIGNOR TO THE WILLYS-OVERLAND COMPANY, OF TOLEDO, OHIO, A CORPORATION OF OHIO.

TUBE-WELDING MACHINE.

Application filed June 21, 1917. Serial No. 176,100.

*To all whom it may concern:*

Be it known that I, EDWARD KAMPER, a citizen of the United States, residing at Toledo, in the county of Lucas and State of Ohio, have invented certain new and useful Improvements in Tube-Welding Machines, of which I declare the following to be a full, clear, and exact description.

This invention relates to improvements in tube-welding machines.

The principal object of this invention is to provide, in a tube-welding machine, simple and efficient means for pre-heating the parts of the tube to be welded together before they pass to the welding means so that the separated edges of the tube, which are to be welded together, will be brought to a welding temperature more quickly and the welding accomplished more expeditiously and satisfactorily.

A further object of my invention is to provide a tube welding machine having improved means for using an electric current to heat the parts of the tube to be welded together.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure, constituting a preferred embodiment of this invention, is illustrated in the accompanying drawing, forming a part of this specification, in which:

Fig. I is a view in side elevation of a machine embodying my invention.

Fig. II is a fragmentary, partly diagrammatic, top plan view of the pre-heating device.

Fig. III is a sectional view taken on line III—III of Fig. II, and

Fig. IV is a sectional view taken on line IV—IV of Fig. III.

In the drawing, similar reference numerals refer to similar parts throughout the several views and the sectional views are taken looking in the direction of the little arrows at the ends of the section lines.

It is common practice in the manufacture of tubing to pass a flat strip of sheet metal through a machine which, by forming rolls or other suitable devices, rolls the strip into tubular form with the edges of the strip disposed in close proximity to each other. These tubes thus formed are passed through a welding machine having a number of rolls mounted on horizontal axes for guiding and straightening the tube, and a pair of squeeze rolls, mounted on horizontal axes, between which the tube passes and which force the edges of the tube into abutting relationship with each other. An oxy-acetylene torch is so disposed as to apply a welding flame to the abutting edges of the tube at substantially the point where the tube is engaged by the squeeze rolls to weld the edges of the tube together and form a complete tube.

In carrying out the objects of my invention, I provide brushes contacting with the metal of the tube and connected with opposite poles of a source of electricity of such a nature as to cause an electric current of suitable intensity to pass longitudinally through the edge of the tube from one brush to the other. The heating effect of this current preheats the parts of the tube which are to be subjected to the welding flame and enables the welding operation to be accomplished more expeditiously and satisfactorily. I also contemplate, in some cases, using a current such that the tube will be heated to a welding temperature by this means alone so that no welding flame or arc is necessary.

I have illustrated in the accompanying drawing a machine in which my invention is embodied and which comprises a base 11 mounted on standards 10 and carrying the pillars 12, 13 and 14. The pillar 14 has journaled therein the horizontal shafts 15 on which are mounted the opposed rolls 16, said shafts being driven in opposite directions by suitable means including the drive pulley 17. The tube A, to be welded, passes between rolls 16 and is fed through the machine by them. A pillar 18 is carried by the base 11 between pillars 13 and 14 and a pair of vertical shafts are carried by said pillar on which the squeeze rolls 19 are mounted. These squeeze rolls are adjustable towards and from each other, such adjustment being effected by the hand wheel 20, and engage on opposite sides of the tube A to force the edges thereof firmly against each other. An oxy-acetylene torch 22 is mounted so as to direct a welding flame on the abutting edges of the tube at substantially the point where the squeeze rolls engage the tube and press the edges thereof together. Rolls 21 are mounted on horizontal shafts carried by the pillars 12 and 13 and support and guide the tube through the machine after the welding is accomplished, serving to straighten and hold the tube in alignment as it is fed through the machine.

Brackets 23 are carried by the pillar 14 and a pair of brushes, of wire gauze, carbon or other suitable conducting material, are slidably mounted in each bracket so that there are a pair of brushes engaging the tube on each side of the open seam and slightly in advance of the welding flame and squeeze rolls. Each bracket has a pair of openings therein, lined with insulating material, 26 and 27, and brushes, 24 and 25, are slidably mounted in said openings, being insulated from the bracket by the insulating linings 26 and 27. Springs 28 are carried by the brackets 23, but insulated therefrom, and have recurved upper ends 29 which engage the upper ends of the brushes to yieldingly hold the brushes in engagement with the tube.

The brushes of each pair are connected with opposite poles of a source of electricity, such as a transformer 30, of such a nature as to deliver an electric current of the proper intensity, the brush 24 being connected to one pole and the brush 25 to the other. It will be seen that a circuit is established of which the longitudinal edge of the tube forms a part, the separate currents being caused to flow independently along said edges between the brushes 24 and 25 on the opposite sides of the open seam of the tube. The passage of this current generates heat in these portions of the tube and, since I provide two pairs of these brushes engaging the tube adjacent the open seam and slightly in advance of the welding point, the portions of the tube to be welded together will be pre-heated and raised towards the welding temperature before they reach the welding point. By this means, the welding can be accomplished more rapidly so that a machine embodying my invention will have a greater capacity than without it, since the tubes can pass through it more rapidly. Furthermore, a better weld or seam is produced and a superior product obtained. In accomplishing this pre-heating, I rely solely on the heating effect of the current passing longitudinally through the edges of the tube and not upon the heating effect of an arc produced by an electric current crossing an air gap.

I have shown two pairs of brushes, one on each side of the open seam, but the number of pairs of brushes is not essential to my invention as I have in mind a number of different groupings or arrangements of these brushes and the arrangement here shown is merely for illustrative purposes. I also contemplate, as within the spirit of my invention, the use of this heating means to effect the welding without any welding flame, it being merely necessary to provide a current of sufficient intensity that the heating effect due to it will raise the portions of the tube adjacent the open seam to the welding temperature.

While the embodiment of my invention here shown is desirable in many ways, it may, nevertheless, be varied considerably without departing from the spirit of my invention and I wish, therefore, to claim my invention both broadly and specifically, as indicated by the scope of the appended claims.

Having thus described my invention, what I claim as new and desire to secure by Letters Patent, is:

1. In a machine of the class described, the combination of means for feeding a tube through the machine, means for pressing the edges of said tube together, means for welding the edges of the tube together including means for directing an electric current longitudinally through a portion of said tube adjacent one edge, and means for directing a separate current longitudinally through a portion of said tube adjacent the other edge.

2. In a machine of the class described, the combination of feed rolls, squeeze rolls for pressing the edges of a tube together, means for welding the edges of said tube together including means for directing an electric current longitudinally through a portion of said tube adjacent one edge, and means for directing a separate current longitudinally through a portion of said tube adjacent the other edge.

3. In a machine for welding together the adjacent edges of a strip formed into a tube, the combination of means for directing an electric current longitudinally through a portion of said tube adjacent one edge, means for directing a separate current longitudinally through a portion of said tube adjacent the other edge, and means for simultaneously pressing said edges together.

4. In a machine for welding together the adjacent edges of a strip formed into a tube, the combination of squeeze rolls for pressing said edges into engagement, and electrical means for heating the edges of said tube including contacts engaging portions of said tube adjacent said edges connected to opposite poles of different sources of electricity, whereby separate currents are caused to pass longitudinally through each of said edge portions.

5. In a machine for welding together the adjacent edges of a strip formed into a tube, the combination of means for feeding said tube through the machine, squeeze rolls engaging opposite sides of said tube to press the adjacent edges together, and electrical means for heating the edges of said tube including contacts arranged in advance of said rolls in engagement with portions of said tube adjacent said edges said contacts being connected with opposite poles of different sources of electricity, whereby separate currents are caused to pass longitudinally through each of said edge portions.

6. In a machine for welding together the adjacent edges of a strip formed into a tube, the combination of means for feeding said tube through the machine, squeeze rolls engaging opposite sides of said tube to press the adjacent edges together, and electrical means for heating the edges of the tube including a pair of contacts in yielding engagement with each edge portion of the tube in advance of said rolls, each pair of contacts being connected with opposite poles of different sources of electricity, whereby separate electric currents are caused to pass longitudinally through each of said edge portions.

7. In a machine for welding together the edges of a strip formed into a tube, the combination of means for directing an electric current longitudinally through a portion of said tube adjacent one edge, means for directing a separate current longitudinally through a portion of said tube adjacent the other edge, means independent of said electrical means for heating the edges of the tube and means for pressing said edges together when heated.

8. In a machine for welding together the adjacent edges of a strip formed into a tube, the combination of electrical means for directing independent electric currents longitudinally of each separated edge portion of the tube, means for simultaneously directing a flame upon said edge portion and means for pressing said edges together.

9. The method of making tubes of metallic plate sections comprising the heating of opposing edges of the plate by passing separate electric currents longitudinally through said edges and thereafter bringing the edges together under pressure.

10. The method of making tubes from rolled sections of metallic plates having their edges in proximity comprising moving the sections in a predetermined path, the heating of the opposite edges of the sections while moving in said path by passing separate electric currents longitudinally through restricted portions of said edges at different times until the welding process is completed and the forcing of the heated edges together under pressure.

11. The method of making tubes from rolled sections of metallic plates having their edges in spaced relation comprising moving the sections in a predetermined path between two or more separate and opposed sets of electrically energized contact members yieldingly engaging said edges to complete separate electric circuits longitudinally therethrough and subsequently forcing the heated edges together under pressure.

In testimony whereof I affix my signature.

EDWARD KAMPER.